United States Patent [19]

Auerbach et al.

[11] Patent Number: 5,043,398

[45] Date of Patent: * Aug. 27, 1991

[54] GRAFTING OF FUNCTIONAL COMPOUNDS ONTO FUNCTIONAL OXYMETHYLENE POLYMER BACKBONES, WITH DIISOCYANATE COUPLING AGENTS, AND THE GRAFT POLYMERS THEREOF

[75] Inventors: Andrew B. Auerbach, Livingston; Jerry A. Broussard, Summit, both of N.J.; Nan L. Yang, Staten Island, N.Y.; James L. Paul, Summit, N.J.

[73] Assignee: Hoechst Celanese Corporation, Somerville, N.J.

[*] Notice: The portion of the term of this patent subsequent to Dec. 4, 2007 has been disclaimed.

[21] Appl. No.: 350,811

[22] Filed: May 12, 1989

[51] Int. Cl.$^5$ .............................................. C08L 61/02
[52] U.S. Cl. .................................... 525/399; 525/130; 525/410; 525/411; 525/415
[58] Field of Search ............... 525/399, 410, 411, 415, 525/130

[56] References Cited

U.S. PATENT DOCUMENTS

| 4,639,488 | 1/1987 | Schuette et al. | 524/456 |
| 4,652,613 | 3/1987 | Collins et al. | 525/69 |
| 4,707,525 | 11/1987 | LaNieve,III et al. | 525/399 |

FOREIGN PATENT DOCUMENTS

| 1267474 | 4/1990 | Canada . |
| 3505524A1 | 10/1985 | Fed. Rep. of Germany . |
| 3441547A1 | 5/1986 | Fed. Rep. of Germany . |

*Primary Examiner*—John C. Bleutge
*Assistant Examiner*—D. E. Aylward
*Attorney, Agent, or Firm*—Nixon & Vanderhye

[57] ABSTRACT

Novel oxymethylene graft polymers are obtained by grafting a functional compound (i.e., a polymer or compound having one or two hydroxyl, carboxyl, or amine functional groups) onto an oxymethylene backbone having pendant hydroxyl groups which serve as reactive sites for the graft reaction with diisocyanate coupling agents.

14 Claims, No Drawings

GRAFTING OF FUNCTIONAL COMPOUNDS ONTO FUNCTIONAL OXYMETHYLENE POLYMER BACKBONES, WITH DIISOCYANATE COUPLING AGENTS, AND THE GRAFT POLYMERS THEREOF

FIELD OF INVENTION

This invention relates to the grafting of functional compounds (i.e. compounds with one or two hydroxyl, carboxyl, or amine functional groups) onto a functional polyacetal backbone (i.e., a polymer having recurring —$CH_2O$— units with attached side chain hydroxyl functionality) with diisocyanate coupling agents, and to the resulting graft copolymers thereby obtained.

BACKGROUND AND SUMMARY OF THE INVENTION

Oxymethylene polymers represent an important class of engineering resins due to numerous favorable physical properties. For this reason, oxymethylene polymers have a wide range of commercial applications, for example, as parts for automobiles, as plumbing components and a variety of household and personal products.

It is oftentimes desirable to modify one or more of the inherently advantageous physical properties of oxymethylene polymers so as to meet the needs of specific end-use applications. Normally, to achieve such modified properties, oxymethylene polymers are usually blended with a variety of other resins and/or ingredients (e.g., impact modifying agents, flame retardants, light and heat stabilizers, fillers, and the like). Usually the blending of property-modifying agents with oxymethylene polymers is not without its own problems due principally to the highly crystalline nature of oxymethylene polymers which is evident in a low level of compatibility with other polymers.

Grafting of functional compounds or polymers (referred collectively to hereafter as functional compounds) onto an functional oxymethylene backbone with diisocyanate coupling agents would present an attractive alternative to blending so as to achieve block copolymers having the desired modified properties and/or to employ such graft copolymers as compatibilizing agents for compositions containing blends of oxymethylene polymer and a polymer with the same backbone as the functional polymer or a polymer which is compatible with the backbone of the functional polymer. However, with oxymethylene polymers, grafting is usually not possible due to the low level of polyacetal end group functionality —that is, since each oxymethylene molecule carries a maximum of two functional groups, e.g., hydroxyl end groups.

According to the present invention, however, grafting of functional compounds or polymers onto oxymethylene backbones with diisocyanate coupling agents is accomplished by increasing the reactive sites on the oxymethylene polymers. That is, the oxymethylene polymers employed in the present invention will exhibit increased functionality, in the form of reactive pendant hydroxyl groups. Hence, these oxymethylene polymers with increased hydroxyl functionality may be reacted with suitable functional compounds, diisocyanate coupling agents, and optionally, monofunctional end capping agents so as to obtain the graft copolymers of this invention.

The preferred oxymethylene polymer backbones onto which the functional compounds are grafted are essentially random copolymers containing oxymethylene units interspersed with higher oxyalkylene units having pendant hydroxyl groups. These pendant functional hydroxyl groups of the higher oxyalkylene units therefore provide reactive sites for the grafting of isocyanate compounds onto the oxymethylene backbone.

The novel graft copolymers of this invention may find usefulness as an engineering resins per se (i.e., as resins in which the functional compounds are chemically bound to the oxymethylene backbone), or as compatibilizing agents so as to compatibilize blends of oxymethylene polymers with other polymers having the same or similar backbones as the backbone of the functional compound or with other polymers that are compatible with the polymer backbone of the functional compound. For example, graft copolymers could be used to improve the mechanical and impact properties of blends of oxymethylene polymers with other appropriate polymers through improvement of interfacial adhesion between incompatible polymers.

The novel graft polymers may also find usefulness as modifiers and additives to oxymethylene polymers with improved effectiveness through improved compatibility.

Further aspects and advantages of this invention will become more clear after consideration is given to the following detailed description thereof.

DETAILED DESCRIPTION OF THE PREFERRED EXEMPLARY EMBODIMENTS

Among the oxymethylene polymers which may be satisfactorily employed as the backbone in the graft polymers of this invention are oxymethylene copolymers having recurring units represented by the following Formulas I, II, and III:

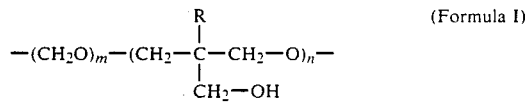

(Formula I)

where R is a C1-C6 alkyl group, and m and n are integers such that m+n is between 5 and 20,000 and the ratio of units of subscript m to the units of subscript n is between 1:1 and 1000:1;

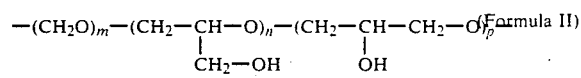

(Formula II)

where m, n, and p are integers such that m+n+p is between 5 and 20,000 and the ratio of units of subscript m to the units of subscript n+p is between 1:1 and 1000:1; and

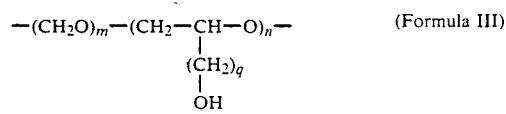

(Formula III)

where q is an integer between 1 and 4, and m and n are integers such that m+n is between 5 and 20,000 and the ratio of units of subscript m to the units of subscript n is between 1:1 and 1000:1.

Generally, oxymethylene copolymers represented by Formulas I-III above may be prepared by the cationic copolymerization of trioxane with cyclic formals having pendant hydroxyl and, particularly, pendant ester functional groups which may subsequently be hydrolyzed to yield a hydroxyl group. The pendant ester functional groups, in particular, are essentially unreactive (i.e. protected) under polymerization conditions and thus survive the copolymerization process. The hydroxyl groups (either present during the copolymerization reaction or ester groups converted to hydroxyl groups during subsequent hydrolysis) will therefore provide reactive sites for grafting of isocyanate compounds according to this invention.

The reader's attention is directed to the following copending and commonly owned patent applications which more fully describe the preferred oxymethylene copolymers which may be used as the backbone of the graft copolymers according to this invention: U.S. Serial No. 07/350,799 filed even date herewith in the names of Jerry A. Broussard et al and entitled "Novel Polyacetal Copolymers of Trioxane and Trimethylolpropane Formal Derivatives"; U.S. Ser. No. 07/350,782 filed even date herewith in the names of Nan Loh Yang et al and entitled "Novel Polyacetal Copolymers of Trioxane and Glycidyl Ester Derivatives"; U.S. Serial No. 07/350,781 (now U.S. Pat. No. 4,975,519) filed even date herewith in the names of Jerry A. Broussard et al and entitled "Novel Polyacetal Terpolymers of Trioxane and $\alpha,\alpha$- and $\alpha,\beta$-Isomers of Glycerol Formal and Functional Derivatives Thereof"; and U.S. Serial No. 07/350,791 (now U.S. Pat. No. 4,975,518) filed even date herewith in the names of Jerry A Broussard et al, entitled "Novel Polyacetal Copolymers of Trioxane and 1,2,6-Hexanetriol Formal Derivatives", the entire content of each of these copending and commonly owned applications being expressly incorporated hereinto by reference.

Monomers other than trioxane and the cyclic formals or their functionalized derivatives as described in the above-mentioned copending U.S. Applications may also be employed so as to form oxymethylene terpolymers or tetrapolymers—that is, polymers having units in the chain derived from trioxane, cyclic formals or their functionalized derivatives, and the other monomer(s) which may be employed. In general, these additional monomers that may be employed are cyclic ethers and cyclic acetals with ethylene oxide, 1,3-dioxolane, 1,3-dioxepane, 1,3-dioxep-5-ene, and 1,3,5-trioxepane being particularly preferred.

As used herein and in the accompanying claims, the term "copolymer" is intended to encompass any polymer having, as at least part of the polymer chain, structural units derived from trioxane and cyclic formals having pendant hydroxyl or ester functional groups. Thus, the term "copolymer" as used herein and in the accompanying claims to describe the oxymethylene backbones useable in this invention is intended to encompass terpolymers, tetrapolymers, and the like which include structural units in the polymer chain derived from trioxane and cyclic formals or their functionalized derivatives, in addition to other units derived from, e.g., the cyclic ether or cyclic acetal monomers described above, if present during polymerization.

Any suitable diisocyanate coupling agent may be employed in the practice of the present invention provided that it is capable of reacting with the pendant hydroxyl groups of the oxymethylene backbone and the functional groups (hydroxyl, carboxyl, and amine groups) of the functional compounds to form a graft polymer. Suitable diisocyanate coupling agents include 1,4-benzene diisocyanate; 3,3'-dimethyl-4,4'-biphenylenediisocyanate; methylene di(-p-phenylisocyanate); 1,6-hexamethylene diisocyanate; 2,6-toluene diisocyanate; 2,4-toluene diisocyanate; and mixtures of the same.

Any suitable functional compound may be employed in the practice of the present invention provided that it is capable of reacting with the diisocyanate coupling agents. As used herein, and in the accompanying claims, the term "functional compound" is intended to refer to any compound or polymer having one or two functional groups (hydroxyl, carboxyl, or amine groups) per chain, preferably terminal functional groups, which undergo an addition reaction with the diisocyanate coupling agents of the present invention.

Thus, for example, suitable functional compounds may include mono and difunctional polyalkylene oxides, polyesters, polyamides, polyolefins, polydienes, and polysiloxanes. Examples of appropriate functional compounds include the following:

A. Mono- and Difunctional Polyalkylene Oxides
  polyethylene glycol
  polypropylene glycol
  polytetramethylene glycol
  mixed polyalkylene oxides
  polyethylene glycol, monoalkyl ethers
B. Mono- and Difunctional Polyesters
  polyethylene terephthalate
  polybutylene terephthalate
  neopentyl glycol terephthalate
  polycyclohexanedimethanol terephthalate
  polyethylene adipate
  polybutylene adipate
  polycaprolactone
  polyester copolymers
C. Mono- and Difunctional Polyamides
  Nylon 4,6
  Nylon 6,6
  Nylon 6,8
  Nylon 6,9
  Nylon 6,10
  Nylon 6,12
  Nylon 6,I
  Nylon 6,T
  Nylon 6
  Nylon 11
  Nylon 12
D. Other mono- and difunctional polymers with hydroxyl, carboxyl, or amine functionality
  functional polyethylene
  functional polypropylene
  functional polybutylene
  functional polyolefin homopolymers and copolymers
  functional polybutadiene
  functional polystyrene
  functional polystyrene-butadiene copolymers
  functional polysiloxanes In addition to hydroxy functional oxymethylene polymers, diisocyanate coupling agents, and functional compounds and polymers, monofunctional endcapping agents may optionally be used to avoid or minimize crosslinking of the other components used to prepare these polymer grafts. Appropriate monofunctional endcapping groups include aliphatic alcohols, aliphatic and aromatic carboxylic acids, and aliphatic and aromatic amines.

The graft copolymers of the present invention may be prepared by one of three general methods.

They can be prepared from hydroxy functional oxymethylene polymers, monofunctional compounds, and diisocyanate coupling agents. For example, a hydroxy functional oxymethylene polymer (POM-OH), and polyethylene glycol monomethyl ether (PEG-OH) can be reacted with toluene diisocyanate (O=C=N—AR—N=C=O) to form polyether-g-polyacetal block copolymer as indicated below.

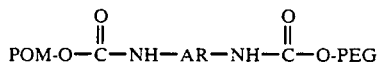

They can also be prepared from hydroxy functional oxymethylene polymer, difunctional compounds, and diisocyanate coupling agents. For example, a hydroxy functional oxymethylene polymer (POM—OH), and polyethylene glycol (HO—PEG—OH) can be reacted with toluene diisocyanate (O=C=N—AR—N=C=O) to form polyether-g-polyacetal block copolymer as indicated below.

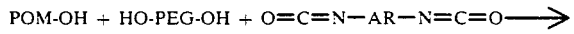

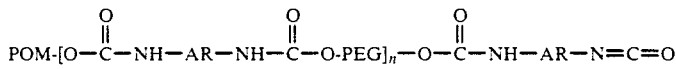

They can also be prepared from hydroxy functional oxymethylene polymers, difunctional compounds, diisocyanate coupling agents, and monofunctional end capping agents. For example, a hydroxy functional oxymethylene polymer (POM—OH), and polyethylene glycol (HO—PEG—OH) can be reacted with toluene diisocyanate (O=C=N—AR—N=C=O) and n-butanol (BuOH) to form polyether-g-polyacetal block copolymer as indicated below.

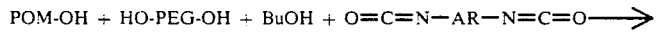

The graft copolymers of the present invention may be prepared in a two stage process in which the functional compounds, diisocyanate coupling agents, and optionally, monofunctional endcapping agents are reacted in an initial step to form isocyanate functional compounds which are reacted with hydroxy functional oxymethylene polymers in a second step. Alternately, they may be prepared in a two stage process in which the hydroxy functional oxymethylene polymers are reacted with a diisocyanate coupling agent to form an isocyanate functional oxymethylene polymer which is reacted with mono- or difunctional compounds in a second step. Finally, they may be prepared by combining and reacting all of the appropriate reagents (hydroxy functional oxymethylene polymers, diisocyanate coupling agents, mono- and difunctional compounds, and optionally, monofunctional endcapping agents) in a single step process.

Preferred conditions for effecting reaction conditions to graft the functional compounds onto the oxymethylene backbones with diisocyanate coupling agents according to this invention are believed to be well within the skills of those in this art. The grafting reaction of functional compounds onto hydroxy functional oxymethylene polymers with diisocyanate coupling agents may be effected in solution in a batch process at elevated temperatures. The grafting reaction of functional compounds onto hydroxy functional oxymethylene polymers with diisocyanate coupling agents may also be effected in a polymer melt in a continuous or batch fashion.

Reaction conditions are chosen to maximize grafting while minimizing degradation of the oxymethylene polymer. For solution grafting, the preferred solvents and solvent mixtures are those that will dissolve or partially dissolve oxymethylene polymers and the isocyanate functional compounds under mild conditions and are essentially inert under reactions conditions. Suitable solvents include dimethylsulfoxide (DMSO), dimethylformamide (DMF), dimethylacetamide (DMA), and N-methylpyrrolidone (NMP). Reaction temperatures for solution grafting are generally in the range of 100°–220° C. and more preferably 140°–180° C. Reaction times are generally in the range of 10 minutes to 24 hours and more preferably 1–10 hours.

Reaction temperatures for melt grafting are generally in the range of 100°–220° C. and more preferably 180°–210° C. Reaction times are generally in the range of 1 minute to 10 hours and more preferably 1–30 minutes.

Further aspects and advantages of this invention will become clear from the following non-limiting Examples.

EXAMPLE I

A. Synthesis of 5-ethyl-5-hydroxymethyl-1,3-dioxane (EHMDO)—Monomer MI

In a one-liter three neck flask were placed 405 grams of 2-ethyl-2-hydroxymethyl-1,3-propanediol, 90 grams of paraformaldehyde, 0.9 grams of p-toluene sulfonic acid monohydrate and 150 ml of toluene. The flask was equipped with a Dean-stark trap and a condenser. The reaction mixture was stirred at a bath temperature of 120° C. to 170° C. for three hours. The toluene-water was collected, and after removing the toluene, the crude product was distilled under vacuum at 10–11 mm Hg and 115° C. to 117° C. 410 grams of 5-ethyl-5-hydroxymethyl-1,3-dioxane (EHMDO) were collected. The product was then dried by molecular sieve and had a water content of about 350 ppm. NMR spectra confirmed that EHMDO was obtained.

B. Synthesis of EHMDO Ester of Acetic Acid—Monomer MII

EHMDO (73 g., 0.5 mol.) acetic anhydride (60 ml., 0.6 mol.) and p-toluene sulfonic acid monohydrate (1.5 g.) were placed in a 250 ml flask fitted with a condenser. The reaction mixture was stirred at a bath temperature of 120°–140° C. for four hours. The acetic acid and anhydride were then removed under vacuum. The resulting monomer was distilled and collected under vacuum. NMR spectra confirmed that monomer MII had been obtained.

C. Synthesis of EHMDO Ester of Acrylic Acid—Monomer MIII

Two synthesis routes to obtain EHMDO ester of acrylic acid were employed as follows:

(i) EHMDO (14.6 g., 0.1 mol.) was placed in a 50 ml three necked flask fitted with a dropper funnel and a drying tube. Acryloyl chloride (9.05 g., 0.1 mol.) was added dropwise into the flask over a period of 15 minutes while being cooled in an ice bath. The generated hydrogen chloride was removed with either nitrogen gas or a water aspirator. The reaction mixture was stirred at room temperature for four hours and at 60°–70° C. for one additional hour under a nitrogen atmosphere. The reaction mixture was then extracted with water (4×50 ml). The water layer was separated and the product was dried overnight with MgSO$_4$. After filtering out the solid MgSO$_4$, the product was distilled with a Widmer column under vacuum. The distillate, which NMR spectra confirmed to be monomer MIII, was then collected.

(ii) EHMDO (88 g., 0.6 mol), acrylic acid (36.4 g., 0.5 mol.), p-toluene sulfonic acid monohydrate (0.5 g.), hydroquinone (0.1 g) and toluene (50 ml) were placed in a 250 ml flask fitted with a Dean-Stark trap and a condenser. The reaction mixture was stirred at a bath temperature of 160°–180° C. for three hours. Toluene-water was collected (water layer, 8 ml). After cooling, the resulting solution was extracted with water (4×150 ml) and the water layer was separated. The crude product was dried with MgSO$_4$ overnight. After filtering the MgSO$_4$, the monomer was distilled with a Widmer column under vacuum. NMR spectra confirmed that the product was monomer MIII.

EXAMPLE II

Purification of Trioxane

The trioxane used was distilled at 114° C. from sodium metal to remove water with benzophenone as indicator, under the protection of dry nitrogen. Two hundred grams of trioxane (Aldrich Co.) were placed in a 500 ml round bottom flask equipped with a magnetic stirrer. The system was heated to about 80° C., then 0.5 gram of sodium metal and 0.3 gram of benzophenone was added under stirring. When water was removed by sodium, the color of solution changed from light yellow to brown, then to blue. After the appearance of the blue color, the temperature was raised to about 114° C. for distillation. Early portions of the distillate were discarded. The collected later portions had a water content of about 40–70 ppm.

Example III

Copolymerization of Trioxane with EHMDO, Monomer MI

A. Bulk Copolymerization

In the case of bulk copolymerization, 2.5 grams of EHMDO were injected into a 25mm×75mm test tube through a serum stopper capped on the test tube. The test tube contained 22.5 grams of trioxane and was equipped with a magnetic stirrer. The test tube was then placed in an oil bath. When the temperature reached 65° C., 3µl of BF$_3$·Et$_2$O was injected. Within several seconds to several minutes, the solution became immobilized by the growth of polymer throughout the test tube. The copolymerization was allowed to proceed at 60° C. to 65° C. for 20–24 hours.

B. Solution Copolymerization

In the case of solution copolymerization, 18 grams of trioxane and 2 grams of EHMDO were placed in a 100 ml round-bottom flask equipped with a magnetic stirrer and containing 20 ml of cyclohexane. When the temperature reached 65° C., 20 µl of BF$_3$·Et$_2$O was injected through the serum stopper every two minutes until copolymerization occurred and a white precipitate appeared. The total amount of initiator was about 60–100 µl for a feed ratio of trioxane to EHMDO of 18:2. The copolymerization was then carried out at 65° C. for four hours.

Copolymers formed according to this Example III will hereinafter be referred to as Copolymer I.

Example IV

Copolymerization of Trioxane with EHMDO Acetate, Monomer MII

Comonomers of trioxane (TOX) and the trimethylolpropane formal derivative obtained in Example I.B (i.e., an EHMDO ester of acetic acid, monomer MII) were copolymerized as follows. Table 1 below sets forth the conditions and results of this Example IV. NMR spectra confirmed that the resulting copolymer contained units derived from the trioxane and MII comonomers. The copolymers obtained by this Example IV will hereinafter be referred to as Copolymer II.

TABLE 1

| Samples No. | Monomers TOX (g) | Monomers MII (g) | BF$_3$·OEt$_2$ (µl) | Solvent Cyclohexane (ml) | Reaction Condition °C./hr | COPOLYMER Yield (%) Before hydro. | COPOLYMER Yield (%) After hydro. | Mole % MII Feed | Mole % MII Product |
|---|---|---|---|---|---|---|---|---|---|
| 1-1 | 10.3 | 1.0 | 10 + 10 | 15 | 65/4 | 96.5 | 61.2 | 4.42 | 3.60 |
| 1-2 | 17.0 | 3.0 | 20 + 20 | 20 | 65/4 | 91.7 | 57.8 | 7.79 | 9.23 |
| 1-3 | 16.0 | 4.0 | 25 | (Bulk) | 65/24 | 93 | 45.0 | 10.69 | 5.99 |
| 1-4 | 22.7 | 1.21 | 3 | (Bulk) | 65/40 | 70 | 65.4 | 2.52 | 1.71 |

EXAMPLE V

Copolymerization of Trioxane with EHMDO Acetate, Monomer MII

Trioxane and a trimethylolpropane formal (TMP) derivative obtained in Example I.C above (i.e., an EHMDO ester of acrylic acid, monomer MIII) were copolymerized in the manner set forth in Example III above. NMR spectra confirmed that the resulting copolymer contained units derived from both the trioxane and the EHMDO ester comonomer. The following Table 2 show the mol % incorporation in the polymer chain of units derived from monomer MIII versus the mol % feed of monomer MIII:

TABLE 2

| MIII Feed | Mole % of MIII in Copolymer | |
|---|---|---|
| (mole %) | (Based on CH3) | (Based on CH=CH2) |
| 4.76 | 1.93 | 0.86 |
| 2.31 | 1.41 | 0.80 |

Polymers obtained according to this Example V will hereinafter be referred to as Copolymer III.

EXAPLE VI

Hydrolysis of Copolymers

The crude copolymers obtained in Example III-V above were ground into small particles, then washed with 1% triethanolamine (TEOA) and methanol solution under stirring conditions for 30–40 minutes so as to neutralize the initiator. The copolymer was then filtered, washed with acetone three times, and dried under vacuum at 50° C. The unstable end groups of copolymer and the homopolymer of trioxane formed in the copolymerization and the ester groups can be removed by base hydrolysis in the following manner.

In a 500 ml two-neck round bottom flask fitted with an air cooled, straight through condenser and magnetic stirrer were placed 20 grams of crude copolymer, 100 ml dimethylformamide (DMF), 100 ml of benzyl alcohol and 1% triethanol amine based on total solution volume. The mixture was stirred and heated at 170°-175° C. to dissolve the copolymer. The contents were maintained at refluxing condition until the visible evolution of formaldehyde ceased. The polymer solution was then cooled to precipitate out the solid material. The solid was removed and washed by acetone three times, then filtered and dried under vacuum at room temperature.

EXAMPLE VII—GRAFTING OF ISOCYANATES

A. Grafting With Copolymer I—Monoisocyanate Prepared from 1-hexadecanol and 1,4-benzenediisocvanate Coplymer I (0.20 g, 0.06 mmole) obtained in Example III above (after base hydrolysis according to Example VI above) was reacted with a monoisocyanate compound (the monoaddition product of 1-hexadecanol and 1,4-benzenediisocyanate, [O=C=N—(p-$C_6H_4$)—N-H—(CO)—O—$(CH_2)_{15}$—$CH_3$], 0.048 g, 0.12 mmole) in dimethylformamide at 160° C. for two hours. The product obtained in this manner was characterized by $^1$H NMR spectroscopy which indicated that 43% of the hydroxyl functionality of the oxymethylene polymer had reacted with the monoisocyanate compound.

A-2. Grafting with Copolymer I and Monoisocyanate Prepared from diethylene glvcol monomethyl ether and 1,4-benzenediisocyanate Copolymer 1 (0.20 g, 0.06 mmole) obtained in Example III above (after base hydrolysis according to Example VI above) was reacted with a monoisocyanate compound (the monoaddition product of diethylene glycol monomethyl ether and 1,4-benzenediisocyanate, [O=C=N—(p-$C_6H_4$)—NH—(CO)—O—$(CH_2)_{15}$—$CH_3$], 0.028 g, 0.12 mmole) in dimethylformamide at 160° C. for two hours. The product obtained in this manner was characterized by $^1$H NMR spectroscopy which indicated that >41% of the hydroxyl functionality of the oxymethylene polymer had reacted with the monoisocyanate compound.

These examples demonstrate that isocyanate grafting of functional compounds onto hydroxy functional oxymethylene polymers can be effected in a two step process in which the functional compound is first reacted with the diisocyanate coupling agent and the resulting product is reacted with the hydroxy functional oxymethylene polymer in a second step. These results also demonstrate the feasibility of grafting a hydroxy functional compound onto a hydroxy functional oxymethylene polymer with diisocyanate coupling agents.

A-3. Reaction of Copolymer I with diisocyanate coupling agents and an amine functional polyamide Copolymer I obtained in Example III above (after base hydrolysis according to Example VI above) was reacted with 1,4-benzene diisocyanate and Elvamide ® 8066 (DuPont) in dimethylformamide in two steps. First, Copolymer I, 1,4-benzene diisocyanate, and solvent were reacted for the indicated times. Then Elvamide ® 8066 was added to the mixture and reacted for an additional period of time. Reaction charges and conditions are described in Table 3. The products obtained in this manner were characterized by $^1$H NMR spectroscopy. The results reported in terms of the percentage of the hydroxyl functionality of the oxymethylene polymers that had reacted with isocyanate functionality are reported in Table 3.

TABLE 3

| | Starting Materials | | | | | | Solvent | Reaction Condition | MI in Copolymer I |
|---|---|---|---|---|---|---|---|---|---|
| | Copolymer I | | OCN—⟨⟩—NCO | | Elvamide ® | | (DMF) | (1) °C./h | Reacted |
| Samples No. | g | MI mmole | g | mmole | g | mmole | (ml) | (2) °C./h | (mole %)* |
| 4-1 | 1.0 | 0.3 | 0.20 | 1.2 | 0.3 | 0.1 | 8 | 160/1 160/1 | 1.48 |
| 4-2 | 0.5 | 0.15 | 0.10 | 0.6 | 0.5 | 0.15 | 4 | 160/2 160/1 | 3.00 |
| 4-3 | " | " | 0.05 | 0.3 | " | " | " | " " | 1.47 |

TABLE 3-continued

| Samples No. | Starting Materials | | | | | | Solvent (DMF) (ml) | Reaction Condition (1) °C./h (2) °C./h | MI in Copolymer I Reacted (mole %)* |
|---|---|---|---|---|---|---|---|---|---|
| | Copolymer I | | OCNNCO | | Elvamide ® | | | | |
| | g | MI mmole | g | mmole | g | mmole⁺ | | | |
| 4-4 | " | " | 0.025 | 0.15 | " | " | " | " | 2.70 |
| | | | | | | | | " | |

*Based on ¹H NMR Positions and Areas of ¹H
⁺Assuming MW of Elvamide ® = 4 × 10³
Notes:
(1) Reaction of Copolymer I, 1,4-benzene diisocyanate, and solvent only
(2) Elvamide (r) added to product obtained from first stage reaction These results demonstrate the feasibility of a two step grafting process in which a hydroxy functional oxymethylene polymer is reacted with a diisocyanate in an initial step and a functional compound is reacted with the resulting product to form a graft polymer. These results also demonstrate the feasibility of grafting an amine functional compound onto a hydroxy functional oxymethylene polymer with diisocyanate coupling agents.

B. Grafting With Copolymer I—Diisocyanates

Copolymer I obtained in Example III above (after base hydrolysis according to Example VI above) was reacted with 1,4-benzene diisocyanate (DICB) in the manner shown in Table 4 below. ¹H NMR spectra confirmed that DICB had been grafted onto a side chain of the oxymethylene copolymer backbone.

TABLE 4

| Sample No. | Copolymer I | | DICB | | Solvent DMF (ml) | Reaction Condition deg. C./hr |
|---|---|---|---|---|---|---|
| | g. | mmol. | g. | mmol. | | |
| VIIa | 0.50 | 0.22 | 0.160 | 1.00 | 5 | 160/2 |
| VIIb | 0.50 | 0.22 | 0.040 | 0.25 | 4 | 160/2 |
| VIIc | 0.50 | 0.22 | 0.064 | 0.40 | 4 | 160/4 |

B-1. Copolymer I, a hydroxy functional oxymethylene polymer, obtained in Example III above (after base hydrolysis according to Example VI above, 0.50 g, 0.22 mmole) was reacted with 1,4-benzene diisocyanate (0.04 g, 0.25 mmole) and Elvamide ® 8066 (1.0 g, 0.25 mole) in two stages. First, Copolymer I and 1,4-benzene diisocyanate were reacted in dimethylformamide (DMF, 5 ml) solvent for two hours at 160° C. Then Elvamide ®, an amine functional polyamide, was added to the mixture which was reacted for an additional three hours at 160° C. After the grafting reaction, the product was characterized by ¹H NMR spectroscopy which indicated that Elvamide ® (3.6 mole %, 5.0 wt %) had been grafted onto the hydroxy functional oxymethylene polymer. The yield of graft polymer based on the amount of copolymer charged was 80%.

C. Grafting With Copolymer II—Diisocyanates

Copolymer II obtained in Example IV above (after base hydrolysis according to Example VI above to convert the pendant ester groups to hydroxyl groups) was reacted with DICB in the manner shown in Table 5 below. ¹H NMR spectra confirmed that DICB had been grafted onto a side chain of the oxymethylene copolymer backbone.

TABLE 5

| Sample No. | Copolymer II | | DICB | | Solvent DMF (ml) | Reaction Condition deg. C./hr |
|---|---|---|---|---|---|---|
| | g. | mmol. | g. | mmol. | | |
| VIId | 0.50 | 0.06 | 0.016 | 0.10 | 4 | 160/3 |
| VIIe | 0.50 | 0.06 | 0.032 | 0.20 | 4 | 160/3 |

C-1. Copolymer II, a hydroxy functional oxymethylene polymer, obtained in example IV above (after base hydrolysis according to Example VI above to convert pendant ester groups to hydroxyl groups, 0.50 g, 0.06 mmole) was reacted with 1,4-benzene diisocyanate (0.016 g, 0.1 mmole) and Elvamide ® 8066 (0.5 g, 0.12 mole) in two stages. First, Copolymer I and 1,4-benzene diisocyanate were reacted in dimethylformamide (DMF, 4 ml) solvent for two hours o at 160° C. Then Elvamide ®, an amine functional polyamide, was added to the mixture which was reacted for an additional three hours at 160° C. After the grafting reaction, the product was characterized by ¹H NMR spectroscopy which indicated oo that Elvamide ® (3.3 mole %, 4.6 wt %) had been grated onto the hydroxy functional oxymethylene polymer. The yield of graft polymer based on the amount of copolymer II charged was 88%.

C-2. Example VII, C-1 was repeated except that the charge of DICB was increased to 0.032 g (0.2 mmole). After the grafting reaction, the product was characterized by ¹H NMR spectroscopy which indicated that Elvamide ® (1.6 mole %, 2.5 wt %) had been grafted onto the hydroxy functional oxymethylene polymer. The yield of graft polymer based on the amount of copolymer II charged was 92%.

D. Grafting With Copolymer III - Diisocyanates

Copolymer III obtained in Example V above (after base hydrolysis according to Example VI above to convert the pendant ester groups to hydroxyl groups) was reacted with DICB in the manner shown in Table 6 below. ¹H NMR spectra confirmed that DICB had been grafted onto a side chain of the oxymethylene copolymer backbone.

TABLE 6

| Sample No. | Copolymer III | | DICB | | Solvent DMF (ml) | Reaction Condition deg. C./hr |
|---|---|---|---|---|---|---|
| | g. | mmol. | g. | mmol. | | |
| VIIf | 0.50 | 0.16 | 0.064 | 0.40 | 5 | 160/2 |
| VIIg | 0.50 | 0.16 | 0.064 | 0.40 | 5 | 160/2 |
| VIIh | 0.50 | 0.16 | 0.128 | 0.80 | 5 | 160/2 |

D-1. Copolymer III, a hydroxy functional oxymethylene polymer, obtained in Example V above (after base hydrolysis according to Example VI above to convert pendant ester groups to hydroxyl groups, 0.50 g, 0.16 mmole) was reacted with 1,4-benzene diisocyanate (0.64 g, 0.4 mmole) and Elvamide ® 8066 (1.0 g, 0.25 mole) in two stages. First, Copolymer I and 1,4-benzene diisocyanate were reacted in dimethylformamide (DMF, 5 ml) solvent for two hours at 160° C. Then Elvamide ®, an amine functional polyamide, was added to the mixture which was reacted for an additional two hours at 160° C. After the grafting reaction, the product was characterized by $^1$H NMR spectroscopy which indicated that Elvamide ® (3.2 mole %, 4.4 wt %) had been grafted onto the hydroxy functional oxymethylene polymer. The yield of graft polymer based on the amount of copolymer III charged was 90%.

D-2. Example VII, D-1 was repeated except that the reaction time for the second stage of the grafting reaction was increased from 2 to 17 hours. After the grafting reaction, the product was characterized by $^1$H NMR spectroscopy which indicated that Elvamide ® (1.9 mole %, 2.7 wt %) had been grafted onto the hydroxy functional oxymethylene polymer. The yield of graft polymer based on the amount of copolymer III charged was 86%.

D-3. Example VII, D-1 was repeated except that the charge of DICB was increased from 0.064 g to 0.128 g (0.8 mmole). After the grafting reaction, the product was characterized by $^1$H NMR spectroscopy which indicated that Elvamide ® (2.9 mole %, 4.0 wt %) had been grafted onto the hydroxy functional oxymethylene polymer. The yield of graft polymer based on the amount of copolymer III charged was 85%.

These results demonstrate the feasibility of a two step grafting process in which a hydroxy functional oxymethylene polymer is reacted with a diisocyanate in an initial step and a functional compound is reacted with the resulting product to form a graft polymer. These results also demonstrate the feasibility of grafting an amine functional compound onto a hydroxy functional oxymethylene polymer with diisocyanate coupling agents.

The above Examples demonstrate that functional polymers may be grafted with diisocyanate coupling agents onto oxymethylene backbones via the pendant hydroxyl functional groups of the oxymethylene polymers. Thus, the novel polymers of this invention permit functional polymers to be chemically bound with diisocyanate coupling agents to oxymethylene polymers, particularly oxymethylene copolymers having pendant hydroxyl functionality so as to be useful as modified resins per se, or as compatibilizers in the blending of oxymethylene polymers with other polymers with the same or similar structures as the functional polymers of this invention.

While the invention has been described in connection with what is presently considered to be the most practical and preferred embodiment, it is to be understood that the invention is not to be limited to the disclosed embodiment, but on the contrary, is intended to cover various modifications and equivalents included within the spirit and scope of the appended claims.

What is claimed is:

1. An oxymethylene graft polymer comprising:
(i) a polyoxymethylene backbone having pendant hydroxyl functional groups which is of the following general formula:

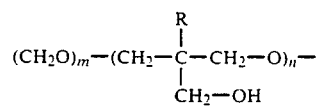

where R is a C1-C6 alkyl group, and m and n are integers such that m+n is between 5 and 20,000 and the ratio of units of subscript m to the units of subscript n is between 1:1 and 1000:1,
(ii) a monofunctional or difunctional compound in which the functional groups are hydroxyl, amine, or carboxylic acid groups,
(iii) a diisocyanate coupling agent, and
(iv) optionally, a monofunctional endcapping agent in which the functional group is a hydroxyl, an amine, or a carboxylic acid group.

2. An oxymethylene graft polymer comprising:
(i) a polyoxymethylene backbone having pendant hydroxyl functional groups of the following general formula:

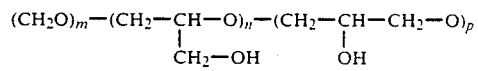

where m, n, and p are integers such that m+n+p is between 5 and 20,000 and the ratio of units of subscript m to the units of subscript n+p is between 1:1 and 1000:1,
(ii) a monofunctional or difunctional compound in which the functional groups are hydroxyl, amine, or carboxylic acid groups,
(iii) a diisocyanate coupling agent, and
(iv) optionally, a monofunctional endcapping agent in which the functional group is a hydroxyl, an amine, or a carboxylic acid group.

3. An oxymethylene graft polymer comprising:
(i) a polyoxymethylene backbone having pendant hydroxyl functional groups of the following general formula:

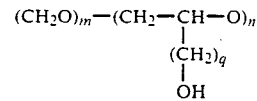

where q is an integer between 1 and 4, and m and n are integers such that m+n is between 5 and and 20,000 and the ratio of units of subscript m to the units of subscript n+p is between 1:1 and 1000:1,
(ii) a monofunctional or difunctional compound in which the functional groups are hydroxyl, amine, or carboxylic acid groups,
(iii) a diisocyanate coupling agent, and
(iv) optionally, a monofunctional endcapping agent in which the functional group is a hydroxyl, an amine, or a carboxylic acid group.

4. An oxymethylene graft polymer as in any one of claims 1-3, in which the diisocyanate coupling agents is at least one selected from a group consisting of 1,4-benzene diisocyanate; 3,3'-dimethyl-4,4'-diphenylenediisocyanate; methylene di(-p-phenylisocyanate); 1, 6-hexamethylene diisocyanate; 2,6-toluene diisocyanate; 2,4-toluene diisocyanate; and mixtures thereof.

5. An oxymethylene graft polymer in any one of claims 1-3, in which the monofunctional and difunctional compounds are selected from the group consisting of mono- and difunctional polyalkylene oxides; mono- and difunctional polyesters; mono-and difunctional polyamides; mono- and difunctional polyolefins; mono- and difunctional polydienes; and mono- and difunctional polysiloxanes.

6. An oxymethylene graft polymer as in any one of claims 1-3, in which the monofunctional and difunctional compounds are selected from the group consisting of polyethylene glycol; polyethylene glycol monoalkyl ether; polypropylene glycol; polytetramethylene glycol; functional polyalkylene oxide copolymers; polyethylene terephthalate; polybutylene terephthalate; polycyclohexanedimethanol terephthalate; polycaprolactone; polyneopentyl glycol terephthalate; polyethylene adipate; polybutylene adipate; copolyesters, nylon 6; nylon 6,6; copolyamides, functional polyethylene; functional polypropylene; functional polybutadiene; functional polystyrene; functional polyolefin copolymers; functional polystyrene-polybutadiene copolymers; and functional polysiloxanes.

7. A method of making an oxymethylene graft polymer comprising grafting a monofunctional or difunctional compound or polymer onto pendant hydroxyl functional reactive sites of a polyoxymethylene backbone with diisocyanate coupling agents and, optionally, with monofunctional endcapping agents, in which the functional groups are hydroxyl, amine, or carboxylic acid groups, and wherein the polyoxymethylene backbone is of the general formula:

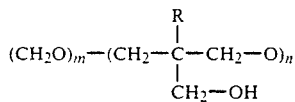

where R is a C1-C6 alkyl group, and m and n are integers such that m+n is between 5 and 20,000 and the ratio of units of subscript m to the units of subscript n is between 1:1 and 1000:1.

8. A method of making an oxymethylene graft polymer comprising grafting a monofunctional or difunctional compound or polymer onto pendant hydroxyl functional reactive sites of a polyoxymethylene backbone with diisocyanate coupling agents and, optionally, with monofunctional endcapping agents, in which the functional groups are hydroxyl, amine, or carboxylic acid groups, and wherein the polyoxymethylene backbone is of the general formula:

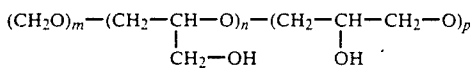

where m, n, and p are integers such that m+n+p is between 5 and 20,000 and the ratio of units of subscripts m to the units of subscript n+p is between 1:1 and 1000:1.

9. A method of making an oxymethylene graft polymer comprising grafting a monofunctional or difunctional compound or polymer onto pendant hydroxyl functional reactive sites of a polyoxymethylene backbone with diisocyanate coupling agents and, optionally, with monofunctional endcapping agents, in which the functional groups are hydroxyl, amine, or carboxylic acid groups, and wherein the polyoxymethylene backbone is of the general formula:

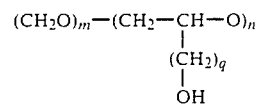

where q is an integer between 1 and 4, and m and n are integers such that m+n is between 5 and 20,000 and the ratio of units of subscript m to the units of subscript n is between 1:1 and 1000:1.

10. A method as in any one of claims 7-9, in which the diisocyanate coupling agents are chosen from a group including: 1,4-benzene diisocyanate; 3,3'-dimethyl-b 4,4'-biphenylenediisocyanate; methylene di(-p-phenylisocyanate); 1,6-hexamethylene diisocyanate; 2,6-toluene diisocyanate; 2,4-toluene diisocyanate; and mixtures thereof.

11. A method as in any one of claims 7-9, in which the monofunctional and difunctional compounds are chosen from a group including the following: mono- and difunctional polyalkylene oxides; mono- and difunctional polyesters; mono- and difunctional polyamides; mono- and difunctional polyolefins; mono- and difunctional polydienes; and mono- and difunctional polysiloxanes.

12. A method as in any one of claims 7-9, in which the monofunctional and difunctional compounds are chosen from a group which includes the following: polyethylene glycol; polyethylene glycol monoalkyl ether; polypropylene glycol; polytetramethylene glycol; functional polyalkylene oxide copolymers; polyethylene terephthalate; polybutylene terephthalate; polycyclohexanedimethanol terephthalate; polycaprolactone; polyneopentyl glycol terephthalate; polyethylene adipate; polybutylene adipate; copolyesters, nylon 6; nylon 6,6; copolyamides, functional polyethylene; functional polypropylene; functional polybutadiene; functional polystyrene; functional polyolefin copolymers; functional polystyrene-polybutadiene copolymers; and functional polysiloxanes.

13. A method as in any one of claims 7-9, in which the polymer grafts are prepared in solution phase reaction.

14. A method as in any one of claims 7-9, in which the polymer grafts are prepared in a polymer melt phase reaction.

* * * * *

UNITED STATES PATENT AND TRADEMARK OFFICE
CERTIFICATE OF CORRECTION

PATENT NO. : 5,043,398

DATED : August 27, 1991

INVENTOR(S) : AUERBACH et al

It is certified that error appears in the above-identified patent and that said Letters Patent is hereby corrected as shown below:

Column 1, line 39, after "referred" insert --to-- and after "collectively" delete "to";
        line 40, after "onto" delete "an" and insert --a--.

Column 2, line 8, after "as" delete "an".

Column 6, line line 16, after "under" change "reactions" to --reaction--.

Column 12, line 47, after "With" change "Copolvmer" to --Copolymer--.

Signed and Sealed this

Seventeenth Day of December, 1991

*Attest:*

HARRY F. MANBECK, JR.

*Attesting Officer*      *Commissioner of Patents and Trademarks*